Patented Jan. 2, 1934

1,941,760

UNITED STATES PATENT OFFICE 1,941,760

METHOD OF PRODUCING VALUABLE PRODUCTS FROM VEGETABLE SUBSTANCES

Erik Ludvig Rinman, Djursholm, Sweden

No Drawing. Application June 30, 1930, Serial No. 465,068, and in Sweden May 26, 1930

8 Claims. (Cl. 202—34)

In my Patent 1,879,502, issued September 27, 1932 on an application No. 397,748, filed October 5, 1929, I have described a method of producing valuable products from vegetable substances, which method principally consists in that the vegetable substances are first boiled with a water solution of barium hydroxide or strontium hydroxide, or a mixture of both, at an elevated temperature and pressure until said substances are substantially all completely decomposed and form compounds with said hydroxide or hydroxides, after which the solution thus obtained with the precipitate therein, optionally after addition of a neutral substance, for instance carbon powder, is evaporated to dryness, and the evaporated mass is subjected to dry distillation, preferably in the presence of superheated steam. Volatile chemical products, such as alcohols, aldehydes, ketones, hydrocarbons, and hydrogen, are then formed in greater or less quantities depending upon whether or not there were free basic hydroxides present during the dry distillation in considerable quantities. During the dry distillation these volatile substances distil over, together with the superheated steam, if used, and are recovered according to well-known methods. During the dry distillation a residue is also formed which consists of carbonate and possibly hydroxide of barium or strontium, or mixtures of both, depending upon which substance was used for the boiling, as well as carbon, irrespective of whether this substance was added or has been formed. These inorganic substances are regenerated by burning in a suitable manner, so that they are again obtained in the form in which they were originally used, for instance in the form of oxides or hydroxides, and may be used for boiling fresh quantities of vegetable substances. According to my said application, in order to further the digestion as well as the dry distillation and also a subsequent regeneration of the barium hydroxide, or strontium hydroxide, or mixture of both, used, inorganic substances, such as calcium oxide, magnesium oxide, aluminium oxide, or the like, may also be added already during the digestion.

Now, the present invention relates to an improvement in the manner of carrying out the method described in my earlier application with the purpose of rendering it considerably less expensive. The invention consists principally in that during the digestion of the vegetable substances with a water solution of barium hydroxide or strontium hydroxide at an elevated temperature and pressure only such quantity is used of barium or strontium hydroxide, or mixture of these hydroxides with each other or with calcium oxide, and so forth, as is required for the digestion, i. e. so that the vegetable substances are substantially all completely decomposed and form compounds with the hydroxide and other inorganic substances used.

This provides the advantage that the quantity of the abovementioned bases or mixtures thereof which must be present during the dry distillation in order that a high yield of chemical products shall be obtained during the same, may afterwards be added in the state of oxides to the viscous solution obtained by the digestion, optionally after concentration of said solution, whereby the heat of reaction developed by the oxide when mixed with the solution and thus transformed into hydroxide, is utilized for the evaporation of water from the solution. The digestion itself requires only about half of the quantity of bases that is required for obtaining a good yield of chemical products during the dry distillation. For instance, if barium oxide is used for the digestion, only about 1000 g. such oxide is required for 1 kg. absolutely dry vegetable matter. It is not necessary to use a greater quantity of added water during the digestion than one corresponding to 1000 g. or at the highest 1500 g. water, including the water contained in the vegetable raw material, per 1000 g. absolutely dry vegetable matter. In other respects the digestion is carried out in the same manner as that described in my co-pending application, blow-offs being made during and after the digestion in order to recover methyl alcohol, hydrogen, and other substances formed during the digestion. Methyl alcohol as well as hydrogen are formed in considerable quantities during the digestion, if performed at as high a temperature as 180° C. When digesting wood, for instance, about 15 g. methyl alcohol and 3 to 4 g. hydrogen are formed per 1000 g. dry wood.

The solution obtained during the digestion is afterwards alkalized by adding the deficient quantity of bases in the state of oxides. In the case of barium, for instance, about 1000 g. barium oxide is added if for the digestion 1000 g. barium oxide was used for 1000 g. dry vegetable matter. If this admixture is made to the solution while it still has a temperature of about 100° C., a lively reaction sets in under development of heat and resultant evaporation of water.

The following may serve as an example of the manner of carrying out the present method. It is assumed that 1000 g. wood chips holding 300 g.

water are to be digested. The wood chips are mixed with a mixture of 1000 g. BaO, 100 g. BaCO₃, and 150 g. CaO, whereupon 900 g. water at a temperature of 80° C. is pumped into the digester. When the water is introduced in the digester, and has reacted with the chemicals, the temperature is increased to about 180° C. by the heat generated, assuming that no heat is consumed for heating the digester itself. For carrying through the digestion it is necessary, however, to introduce about 100 g. steam. When the digestion is completed, and the digester has been blown off, it contains about 1150 g. water, and when its temperature has been blown down to 100° C., only 950 g. water remains in the solution. The solution is now mixed with 1000 g. BaO, 100 g. BaCO₃, and 150 g. CaO. This causes about 300 g. water to evaporate, so that the water quantity is decreased to 650 g.

It will thus be seen that according to my present improvement only about half of the total quantity of the chemicals required for performing the digestion and the dry distillation, is added to the material before the digestion, and that the rest of said chemicals in the state of oxides is added to the solution obtained by the digestion whereby a considerable quantity of water is evaporated from the same, so that a corresponding saving of fuel is obtained.

In order that the mass shall become sufficiently dry for being dry distilled in a continuously operated furnace, it is necessary to remove a further quantity of 300 g. water, which quantity must thus be removed by drying, for instance on drying cylinders, or by heating the mass spread out in a thin layer on an endless band by means of hot air.

If the vegetable substances used, or the chemicals used, contain sulphur, it is suitable during the digestion as well as during the subsequent alkalization to add so large a quantity of barium dioxide, or strontium dioxide, that all such sulphur is transformed into barium sulphate, or strontium sulphate, so that no sulphur is contained in the products formed and distilled over during the boiling or during the dry distillation. The barium sulphate is afterwards reduced to barium sulphide when the barium carbonate in the residue of the dry distillation is regenerated as barium oxide by a reducing burning. In order that the quantity of sulphur shall not be increased by repeated use of the same quantity of barium, it is only required each time to separate 5 or 10 per cent of the barium oxide regenerated by the burning, and leach said quantity with water whereby barium hydroxide and barium sulphydrate are formed. The former is again used in the manufacture, while the barium sulphydrate is separated and treated with carbon dioxide to recover carbonate.

If the vegetable material used contains silica, this substance may also be removed simultaneously with the sulphur by boiling out barium hydroxide from the separated 5 to 10 per cent barium oxide, whereby calcium hydroxide and calcium silicate are obtained as a residue.

All kinds of vegetable substances, phanerogams as well as cryptogams, are suitable as raw materials. However, they must not be moulded. Wood from foliiferous trees, and reed, straw, and grass give as a rule a greater yield of chemical products than, for instance, wood from coniferous trees. The vegetable substances are best used in a subdivided state, for instance subdivided to the same size as ordinary wood chips or chopped straw for the pulp manufacture, or in the form of saw dust. The boiling is most suitably carried out in a rotary digester for direct heating with steam, and which is designed for a working pressure of 12 to 15 kg. per cm.², so that during the boiling the temperature may be run up to about 185° C. without danger. The most suitable boiling temperature, however, is 180° C.

It will be obvious that the barium compounds used in the present method may be replaced by the corresponding strontium compounds, and the term "barium" used in the claims should therefore be understood as being equivalent to strontium.

Also, since as above stated, instead of calcium oxide, other substances such as magnesium oxide, aluminium oxide, and the like, may be used, the term "calcium oxide" used in the claims should be understood as being equivalent to said substances.

I claim:

1. The method of producing valuable products from raw cellulosic vegetable substances, which comprises digesting the vegetable substances with an aqueous solution of barium hydroxide at an elevated temperature and pressure so that said substances are substantially all completely decomposed and form compounds with said hydroxide, adding to the solution obtained by the digestion a quantity of barium oxide so as to cause a reaction between said barium oxide and the water in the solution, whereby heat is generated, thereby driving off water from the solution, and subjecting the residue to dry distillation.

2. The method of producing valuable products from raw cellulosic vegetable substances, which comprises digesting the vegetable substances with an aqueous solution of barium hydroxide at an elevated temperature and pressure so that said substances are substantially all completely decomposed and form compounds with said hydroxide, adding to the solution obtained by the digestion a quantity of barium oxide so as to cause a reaction between said barium oxide and the water in the solution, whereby heat is generated, thereby driving off water from the solution, evaporating said solution to dryness, and subjecting the evaporated mass to dry distillation.

3. The method of producing valuable products from raw cellulosic vegetable substances, which comprises digesting the vegetable substances with an aqueous solution of barium hydroxide mixed with calcium oxide at an elevated temperature and pressure so that said substances are substantially all completely decomposed and form compounds with said hydroxide and oxide, adding to the solution obtained by the digestion a quantity of barium oxide and calcium oxide so as to cause a reaction between said oxides and the water in the solution, whereby heat is generated, thereby driving off water from the solution, and subjecting the residue to dry distillation.

4. The method of producing valuable products from raw cellulosic vegetable substances, which comprises digesting the vegetable substances with an aqueous solution of barium hydroxide mixed with calcium oxide at an elevated temperature and pressure so that said substances are substantially all completely decomposed and form compounds with said hydroxide and oxide, adding to the solution obtained by the digestion a quantity of barium oxide and calcium oxide so as to cause a reaction between said oxides and the water in the solution, whereby heat is generated, thereby driving off water from the solution, evaporating said solution to dryness, and subjecting the evaporated mass to dry distillation.

5. The method of producing valuable products from raw cellulosic vegetable substances containing sulphur, which comprises digesting the vegetable substances with an aqueous solution of barium hydroxide mixed with barium dioxide at an elevated temperature and pressure so that said substances are substantially all completely decomposed and form compounds with said hydroxide and sulphur present in the vegetable substances is combined with said barium dioxide to form barium sulphate, adding to the solution obtained by the digestion a quantity of barium oxide so as to cause a reaction between said barium oxide and the water in the solution, whereby heat is generated, thereby driving off water from the solution and a quantity of barium dioxide sufficient for transforming sulphur contaminating said barium oxide into sulphate, and subjecting the residue to dry distillation.

6. The method of producing valuable products from raw cellulosic vegetable substances containing sulphur, which comprises digesting the vegetable substances with an aqueous solution of barium hydroxide mixed with barium dioxide at an elevated temperature and pressure so that said substances are substantially all completely decomposed and form compounds with said hydroxide and sulphur present in the vegetable substances is combined with said barium dioxide to form barium sulphate, adding to the solution obtained by the digestion a quantity of barium oxide so as to cause a reaction between said barium oxide and the water in the solution, whereby heat is generated thereby driving off water from the solution and a quantity of barium dioxide sufficient for transforming sulphur contaminating said barium oxide into sulphate, evaporating said solution to dryness, and subjecting the evaporated mass to dry distillation.

7. The method of producing valuable products from raw cellulosic vegetable substances containing sulphur, which comprises digesting the vegetable substances with an aqueous solution of barium hydroxide mixed with calcium oxide and barium dioxide at an elevated temperature and pressure so that said substances are substantially all completely decomposed and form compounds with said barium hydroxide and calcium oxide and sulphur present in the vegetable substances is combined with said barium dioxide to form barium sulphate, adding to the solution obtained by the digestion a quantity of barium oxide and calcium oxide so as to cause a reaction between said oxides and the water in the solution, whereby heat is generated, thereby driving off water from the solution and a quantity of barium dioxide sufficient for transforming sulphur contaminating said barium and calcium oxides into sulphate, and subjecting the residue to dry distillation.

8. The method of producing valuable products from raw cellulosic vegetable substances containing sulphur, which comprises digesting the vegetable substances with an aqueous solution of barium hydroxide mixed with calcium oxide and barium dioxide at an elevated temperature and pressure so that said substances are substantially all completely decomposed and form compounds with said barium hydroxide and calcium oxide and sulphur present in the vegetable substances is combined with said barium dioxide to form barium sulphate, adding to the solution obtained by the digestion a quantity of barium oxide and calcium oxide so as to cause a reaction between said oxides and the water in the solution, whereby heat is generated, thereby driving off water from the solution and a quantity of barium dioxide sufficient for transforming sulphur contaminating said barium and calcium oxides into sulphate, evaporating said solution to dryness, and subjecting the evaporated mass to dry distillation.

ERIK LUDVIG RINMAN.